(12) United States Patent
Yoshikawa et al.

(10) Patent No.: US 7,305,149 B2
(45) Date of Patent: Dec. 4, 2007

(54) IMAGE PICKUP INFORMATION RECOGNITION SYSTEM

(75) Inventors: Shoji Yoshikawa, Tokyo (JP); Katsuhiko Yamada, Tokyo (JP); Masafumi Yamaguchi, Tokyo (JP); Akito Takeya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 799 days.

(21) Appl. No.: 10/230,251

(22) Filed: Aug. 29, 2002

(65) Prior Publication Data

US 2003/0169903 A1    Sep. 11, 2003

(30) Foreign Application Priority Data

Mar. 11, 2002   (JP)   ............................. 2002-065371

(51) Int. Cl.
    *G06K 9/54*   (2006.01)
    *G06K 9/60*   (2006.01)
(52) U.S. Cl. ................ 382/305; 382/103; 701/208
(58) Field of Classification Search ................ 701/28; 382/305
     See application file for complete search history.

(56) References Cited

U.S. PATENT DOCUMENTS

| | | | | | |
|---|---|---|---|---|---|
| 4,933,864 | A | * | 6/1990 | Evans et al. ................. | 701/207 |
| 4,947,094 | A | * | 8/1990 | Dyer et al. .................. | 318/587 |
| 4,954,962 | A | * | 9/1990 | Evans et al. ................. | 701/28 |
| 5,025,261 | A | * | 6/1991 | Ohta et al. ............. | 342/357.09 |
| 5,155,683 | A | * | 10/1992 | Rahim ........................ | 701/25 |
| 5,208,750 | A | * | 5/1993 | Kurami et al. ............... | 701/28 |
| 5,245,422 | A | * | 9/1993 | Borcherts et al. ........... | 348/119 |
| 5,259,038 | A | * | 11/1993 | Sakou et al. ............... | 382/158 |
| 5,414,462 | A | * | 5/1995 | Veatch ........................ | 348/135 |
| 5,495,576 | A | * | 2/1996 | Ritchey ...................... | 345/420 |
| 5,525,883 | A | * | 6/1996 | Avitzour ..................... | 318/587 |
| 5,621,807 | A | * | 4/1997 | Eibert et al. ................ | 382/103 |
| 5,633,946 | A | * | 5/1997 | Lachinski et al. .......... | 382/103 |

(Continued)

FOREIGN PATENT DOCUMENTS

JP   9-218955   8/1997

(Continued)

OTHER PUBLICATIONS

IEEE 100: the authoritative dictionary of IEEE standard terms, 7th ed.. ISBN 0-7381-2601-2, pp. 197-198, 2000.*

*Primary Examiner*—Matthew C. Bella
*Assistant Examiner*—Sath V. Perungavoor
(74) *Attorney, Agent, or Firm*—Leydig, Voit & Mayer, Ltd.

(57) ABSTRACT

An image collating center has a communication unit, a processing unit, and a memory unit. The processing unit accesses a geographic information database through a communication network, extracts appropriate geographic information from the geographic information database based on a picked-up image and additional information transmitted from an image provider, and generates a simulated image assumed to be viewed from the image provider. Further, the image collating center estimates the image pickup position and the image pickup attitude of the image provider through collating the simulated image with the picked-up image and returns the estimated image pickup position and image pickup attitude of the image provider to the image provider through the communication network.

4 Claims, 5 Drawing Sheets

U.S. PATENT DOCUMENTS

| | | | |
|---|---|---|---|
| 5,848,374 A * | 12/1998 | Wakabayashi et al. | 701/212 |
| 5,881,969 A * | 3/1999 | Miller | 244/3.17 |
| 5,911,767 A * | 6/1999 | Garibotto et al. | 701/28 |
| 5,938,710 A * | 8/1999 | Lanza et al. | 701/50 |
| 5,999,866 A * | 12/1999 | Kelly et al. | 701/28 |
| 6,011,494 A * | 1/2000 | Watanabe et al. | 340/995.14 |
| 6,067,367 A * | 5/2000 | Nakajima et al. | 382/103 |
| 6,084,989 A * | 7/2000 | Eppler | 382/293 |
| 6,133,947 A * | 10/2000 | Mikuni | 348/143 |
| 6,157,875 A * | 12/2000 | Hedman et al. | 701/1 |
| 6,222,583 B1 * | 4/2001 | Matsumura et al. | 348/113 |
| 6,272,431 B1 * | 8/2001 | Zamojdo et al. | 701/211 |
| 6,285,317 B1 * | 9/2001 | Ong | 342/357.13 |
| 6,324,299 B1 * | 11/2001 | Sarachik et al. | 382/151 |
| 6,377,210 B1 * | 4/2002 | Moore | 342/357.13 |
| 6,453,223 B1 * | 9/2002 | Kelly et al. | 701/28 |
| 6,804,524 B1 * | 10/2004 | Vandermeijden | 455/456.1 |
| 6,813,395 B1 | 11/2004 | Kinjo | |

FOREIGN PATENT DOCUMENTS

| | | |
|---|---|---|
| JP | 11-66355 | 3/1999 |
| JP | 11-271074 | 10/1999 |
| JP | 2001-34632 | 2/2001 |

* cited by examiner

IMAGE PICKUP INFORMATION RECOGNITION SYSTEM

BACKGROUND OF THE INVENTION

1. Field of the Invention

This invention relates to an image pickup information recognition system and more particularly to an image pickup information recognition system for collating a picked-up image acquired by an image providing source with an image based on a geographic information database, thereby acquiring precise image pickup information of the image providing source. The image pickup information refers to at least one of the image pickup position, the image pickup attitude, etc., of the picked-up image acquired by the image providing source.

2. Description of the Related Art

A geographic information database on which an image pickup information recognition system is founded includes geographic information superposed in a stratified manner from the features of the structures of roads, bridges, buildings, etc., to the attributes of the names and ages of residents further to the land use circumstances on the three-dimensional geographic space of a map. Using a map database and a mark image database forming parts of the geographic information database, it is made possible to photograph the surrounding image with a camera installed in a vehicle and collating the image with the mark image database, thereby estimating the current position of the vehicle. For example, FIG. 6 is a drawing to show an image pickup information recognition system in a related art and is a block diagram to show a mark image collating equipment for collating a location on the map with a location in the real world. In FIG. 6, numeral 101 denotes an image photographing section for photographing the surrounding image of a vehicle, numeral 102 denotes a current position estimation section for estimating the current position of the vehicle, numeral 103 denotes a mark image database system for storing mark images, numeral 104 denotes an image collating section for collating the image photographed by the image photographing section 101 with the mark image related to the estimated current position estimated by the current position estimation section 102, numeral 105 denotes a map collating section, numeral 106 denotes a map database system, numeral 107 denotes a route plan section, and numerals 108 and 109 denote input sections. The image pickup information recognition system in the related art described above corrects the estimated current position on the map in accordance with the collating result of the image collating section 104.

The mark image collating apparatus of the image pickup information recognition system in the related art is configured as described above and viewing a mark varies depending on the viewing direction of the mark and thus even the mark contained in the mark image database cannot always be collated and if a database is constructed so that the image can be collated with the mark image independently of the viewing way of the mark, the size of the database becomes huge and there is a fear of losing the practicality. In the image pickup information recognition system in the related art typified by the mark image collating apparatus, the image provider needs to provide a complete set of the devices from image photographing to collating and particularly for image collating and map collating, a large load is applied to a computer and thus the required apparatus becomes expensive and large-sized and leads to a heavy burden on the image provider; this is a problem.

SUMMARY OF THE INVENTION

It is therefore an object of the invention to provide an image pickup information recognition system for making it possible to obtain precise image pickup information of an image provider without imposing an excessive load on the image provider.

According to the invention, there is provided an image pickup information recognition system comprising reception section for receiving a picked-up image and additional information concerning the picked-up image from an image providing source through a communication network, processing section for extracting geographic information from a geographic information database based on the additional information concerning the picked-up image received, simulatively generating a simulated image assumed to be viewed from the image providing source, collating the simulated image with the picked-up image received from the image providing source, and estimating an image pickup position or an image pickup attitude of the picked-up image in response to the collating result, and transmission section for transmitting the estimated image pickup position or image pickup attitude to the image providing source.

In the image pickup information recognition system of the invention, the processing section includes section for extracting geographic information from the geographic information database based on the additional information concerning the picked-up image received and simulatively generating a plurality of simulated images assumed to be viewed from the image providing source, section for collating each of the plurality of simulated images with the picked-up image, and section for estimating that position information or attitude information in the simulated image having the maximum match degree with the picked-up image is the image pickup position or the image pickup attitude of the picked-up image.

In the image pickup information recognition system of the invention, the processing section includes section for extracting geographic information from the geographic information database based on the additional information concerning the picked-up image received and simulatively generating a simulated image assumed to be viewed from the image providing source, section for collating the simulated image with the picked-up image, section for repeating generation of the simulated image and collation of the simulated image with the picked-up image a setup number of times or less until the match degree between the simulated image and the picked-up image becomes equal to or greater than a predetermined value, and section for estimating that position information or attitude information in the simulated image when the match degree between the simulated image and the picked-up image is equal to or greater than the predetermined value is the image pickup position or the image pickup attitude of the picked-up image.

The image pickup information recognition system of the invention further includes section for requesting the image providing source to additionally transmit a picked-up image or additional information.

DETAILED DESCRIPTION OF THE PREFERRED EMBODIMENTS

First Embodiment

A first embodiment of the invention will be discussed with reference to FIG. 1.

Figure 1:
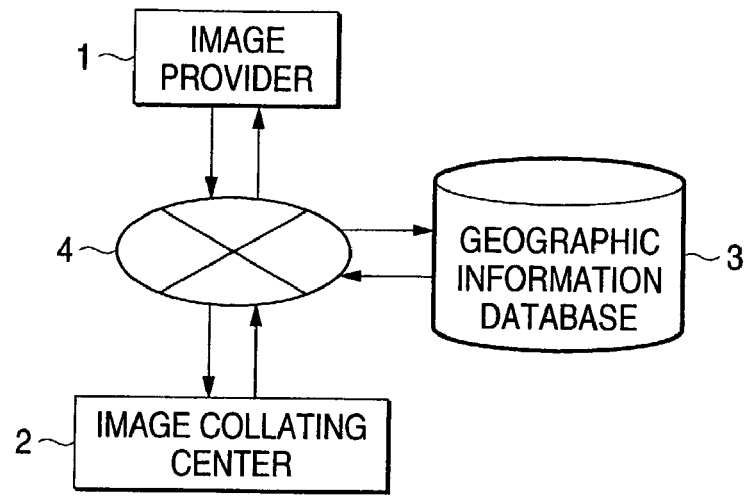
FIG. 1 is a drawing to describe an image pickup information recognition system according to a first embodiment of the invention.

FIG. 1 is a drawing to describe an image pickup information recognition system (position/attitude recognition system) according to the first embodiment of the invention and is a diagram to represent the whole relationship among an image provider, an image collating center, and a geographic information database. In FIG. 1, numeral 1 denotes an image provider (image providing source), numeral 2 denotes an image collating center, numeral 3 denotes a geographic information database, and numeral 4 denotes a communication network. Information can be exchanged among the image provider 1, the image collating center 2, and the geographic information database 3 through the communication network 4.

The image provider 1 acquires the image of the landscape, building, etc., surrounding the image provider as a picked-up image and transmits the picked-up image together with additional information (described later) to the image collating center 2 through the communication network 4. The image collating center 2 accesses the geographic information database 3 through the communication network 4 based on the additional information transmitted together with the picked-up image from the image provider 1, extracts appropriate geographic information from the geographic information database 3, and simulatively generates the image of the surrounding landscape, building, etc., assumed to be viewed from the image provider 1 to provide a simulated image. Further, the image collating center 2 estimates the image pickup position, the image pickup attitude (image pickup direction), etc., of the image provider 1 through collating the simulated image provided by simulatively generating the image with the picked-up image transmitted from the image provider 1 and returns the estimated image pickup position, image pickup attitude, etc., of the image provider 1 to the image provider 1 through the communication network 4.

Here, the communication network 4 is a generic name for wired or wireless communication network typified by the Internet, an intranet, a dialup line, etc.

The geographic information database 3 is electronic information representing the real world by a computer as information on the geographic space, typified by GIS (Geographic Information System). The image is a generic term for still and moving images.

The additional information transmitted together with the picked-up image includes information indicating at least the rough position of the image provider and includes not only position information entered directly by the image provider 1, but also position information indirectly occurring with the action of transmitting data by the image provider 1, such as the date and time at which the image provider 1 transmits the picked-up image and if the image provider 1 uses a local radio transmitter such as a PHS or a mobile telephone, the address of the base station receiving the radio.

The information returned by the image collating center 2 to the image provider 1 may include not only the estimated image pickup position of the image provider 1, but also the estimated image pickup attitude of the image provider 1 and an image seemed to be advantageous for the image provider 1 as auxiliary images. As examples of the transmitted auxiliary images, zoomed-in or zoomed-out simulated images of the landscape, buildings, etc., surrounding the image provider 1, a simulated image containing the destination if it is assumed that the destination can be viewed from the image provider 1, a simulated image containing a mark used as a key of the route to the destination if it is assumed that the destination cannot be viewed from the image provider 1, and the like are included.

Figure 2:
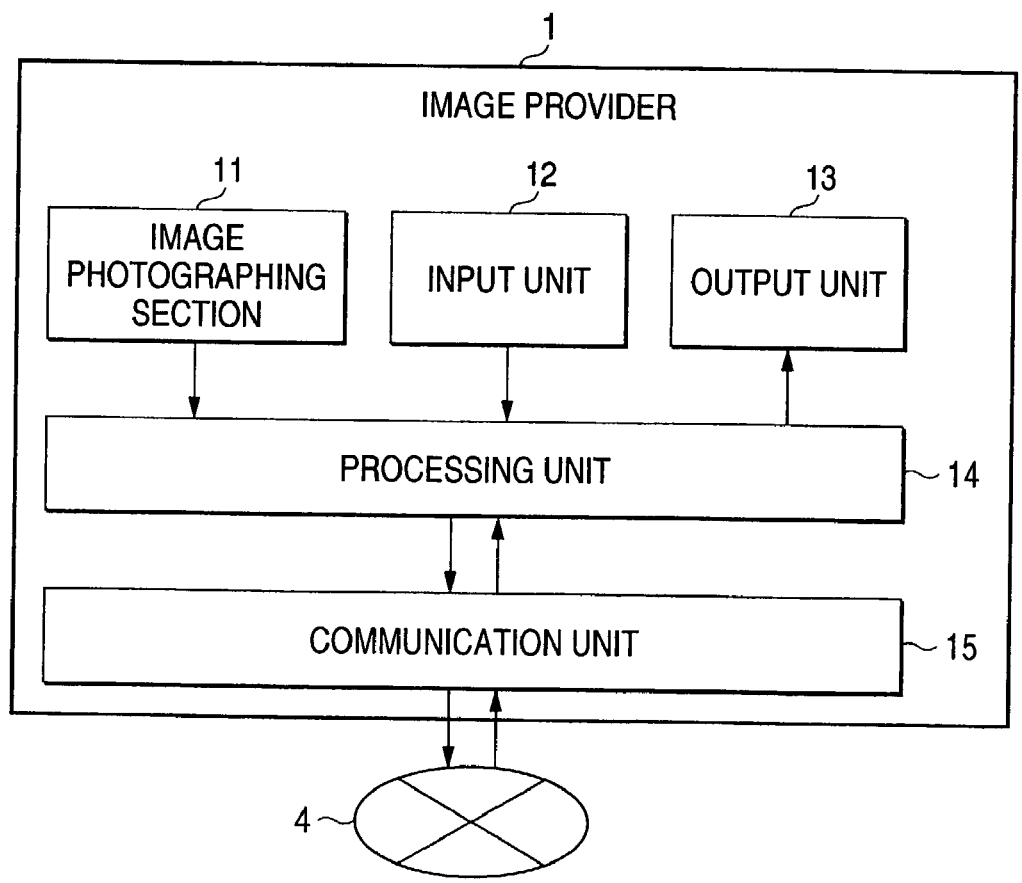
FIG. 2 is a drawing to show the configuration of an image providing source according to the first embodiment of the invention.

FIG. 2 is a drawing to show the relationship between the image provider 1 and the communication network 4 in FIG. 1 in more detail. The inside of the image provider 1 is divided into an image photographing section 11, an input unit 12, an output unit (display) 13, a processing unit 14, and a communication unit 15. The image provider 1 uses the image photographing section 11 to photograph the landscape, buildings, etc., surrounding the image provider. The image provider 1 uses the input unit 12 to input user information to access the image collating center 2 or additional information of the circumstances, etc., at the image acquiring time used as reference for the image collating center 2 to collate the picked-up image. The provided picked-up image and additional information are transmitted by the processing unit 14 through the communication unit 15 to the communication network 4. Further, the processing unit 14 receives information sent from the image collating center 2 via the communication network 4 through the communication unit 15 to the image provider 1, and displays the received information on the display 13. The image provider 1 again uses the image photographing section 11 to acquire an additional image of the surrounding image, etc., or uses the input unit 12 to input additional information of the surrounding circumstances, the destination to which the image provider 1 wants to move, etc., and then again transmits the additional image or the additional information to the communication network 4 through the communication unit 15 by the processing unit 14 depending on the display contents of the display 13.

Figure 3:
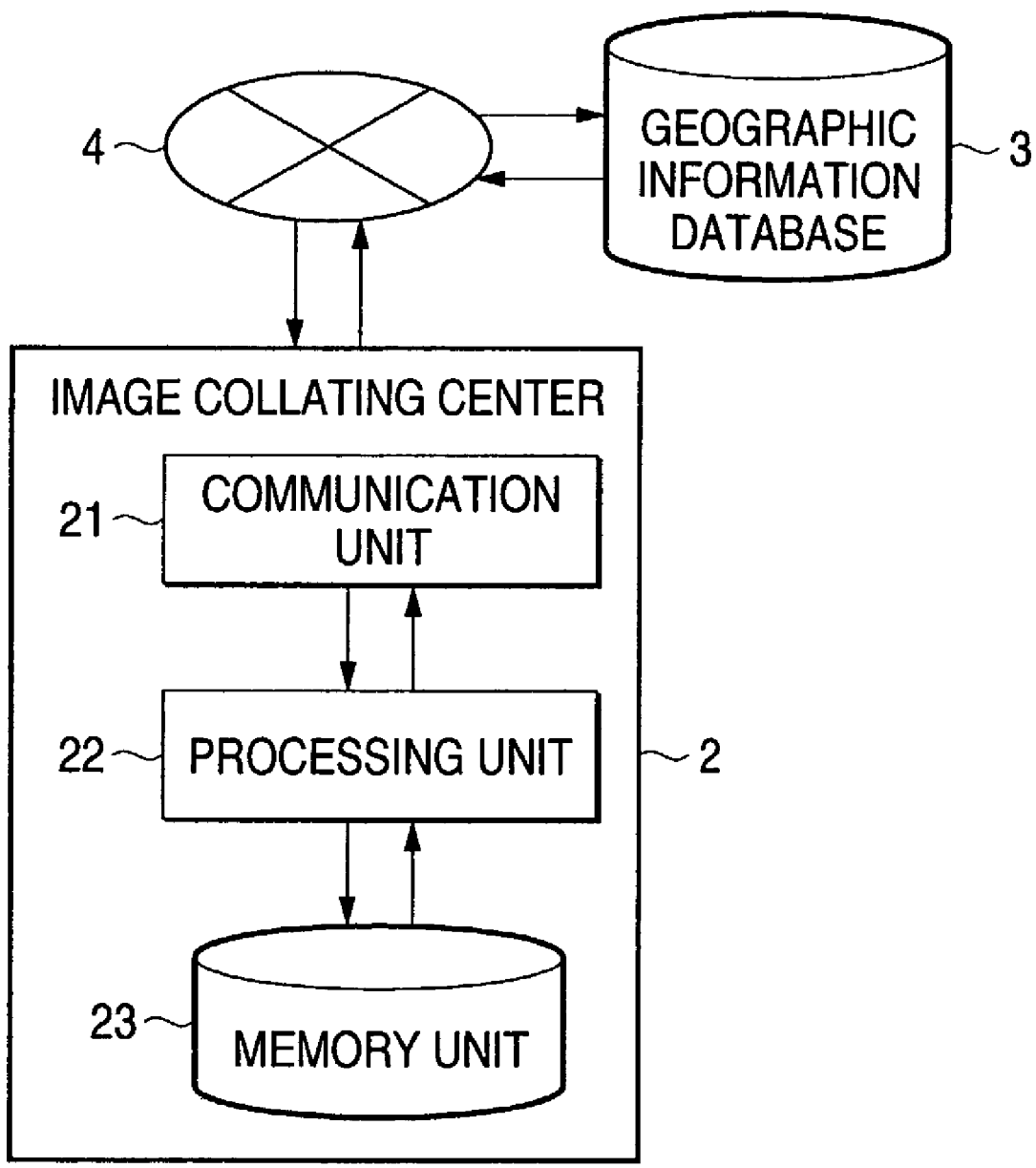
FIG. 3 is a drawing to show the configuration of an image collating center according to the first embodiment of the invention.

FIG. 3 is a drawing to show the relationship between the image collating center 2 and the communication network 4 in FIG. 1. The inside of the image collating center 2 is divided into a communication unit 21, a processing unit 22, and a memory unit 23. In the image collating center 2, the communication unit 21 receives a picked-up image and additional information from the image provider 1 through the communication network 4 in accordance with a command of an operator (not shown) or a program instruction. Based on the received additional information, the processing unit 22 accesses a geographic information database in the memory unit 23 or accesses the external geographic information database 3 via the communication network 4 through the communication unit 21 as required, extracts geographic information stored in the geographic information database in the memory unit 23 or geographic information stored in the external geographic information database 3, and simulatively generates a simulated image assumed to be viewed from the image provider 1. Further, the processing unit 22 collates the simulated image with the picked-up image received from the image provider 1 and estimates the image pickup position, the image pickup attitude, etc., of the picked-up image in response to the collating result. The estimation result is transmitted through the communication unit 21 via the communication network 4 to the image provider 1. The transmitted estimation result may be both or either of the image pickup position and the image pickup attitude photographing the image by the image provider 1. To collate the simulated image with the picked-up image, if additional information, such as the rough values of the photographing position and the photographing direction, the photographing time of day, and the camera characteristics, can be used, the collating accuracy can be enhanced by using the additional information.

Figure 4:
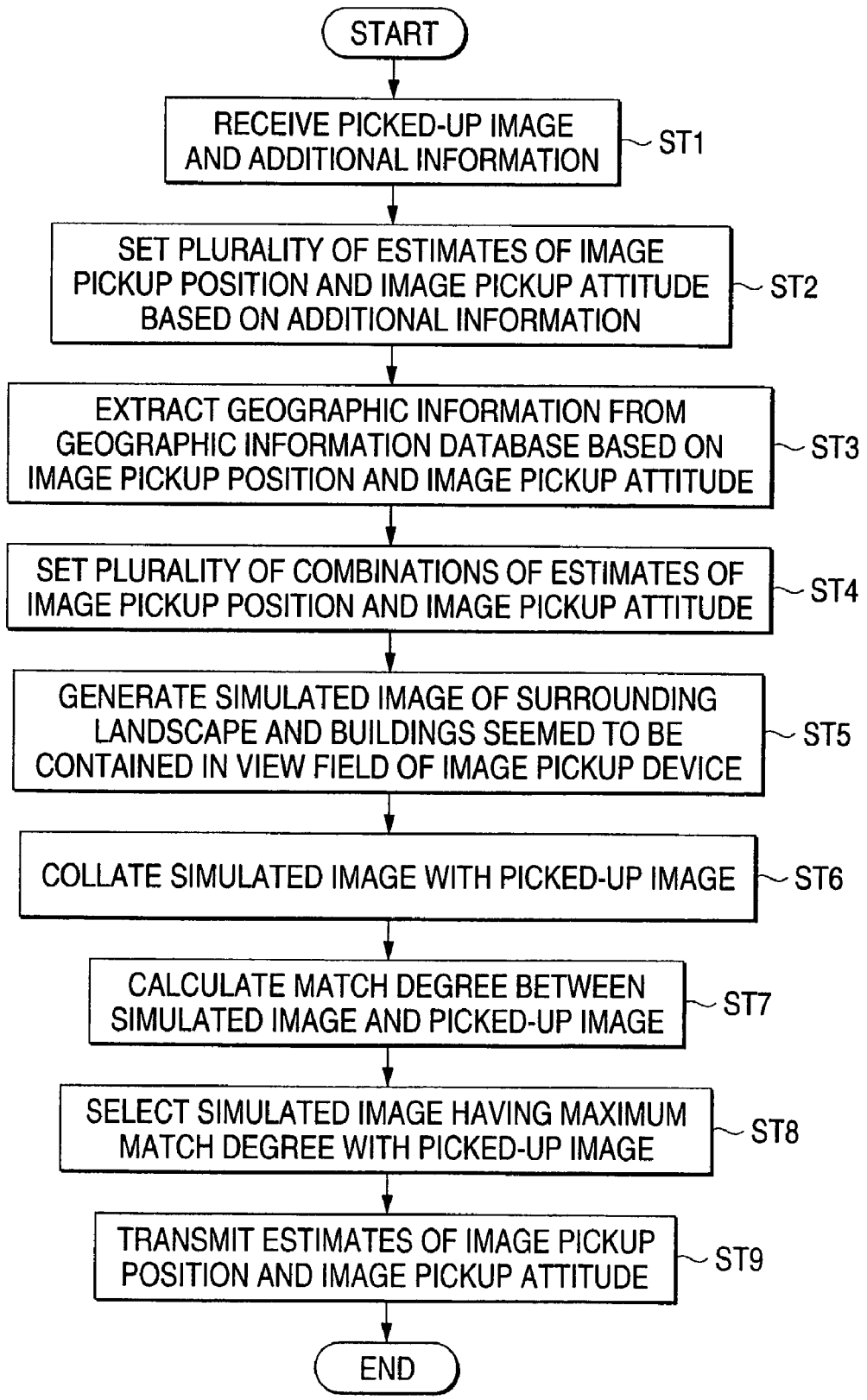
FIG. 4 is a flowchart to show the operation of the image collating center according to the first embodiment of the invention.

Next, the operation of the image collating center in the image pickup information recognition system of the embodiment will be discussed in more detail with reference to a flowchart of FIG. 4.

To begin with, at step ST1, a picked-up image and additional information from the image provider are received through the communication network. The additional information transmitted together with the picked-up image includes information indicating at least the rough position of the image provider as described above, and at step ST2, a plurality of estimates of the image pickup position and the image pickup attitude (image pickup direction) are set based on the information contained in the received additional information. At step ST3, geographic information corresponding to the plurality of estimates of the image pickup position and the image pickup attitude set at step ST2 is extracted from the geographic information database. At step ST4, a plurality of combinations of the setup estimates of the image pickup position and the image pickup attitude are set. At step ST5, a simulated image of the surrounding landscape and buildings seemed to be contained in the view field of the image pickup device in the image provider are simulatively generated for each of the combinations. At step ST6, each of the simulated images simulatively generated for the combinations is collated with the picked-up image received from the image provider. At step ST7, the match degree between each of the simulated images and the picked-up image is calculated. At step ST8, the simulated image having the maximum match degree with the picked-up image is selected and the estimates of the image pickup position and the image pickup attitude corresponding to the simulated image are estimated to be the image pickup position and the image pickup attitude of the image provider and at step ST9, the estimates of the image pickup position and the image pickup attitude are returned to the image provider through the communication network 4.

As described above, in the embodiment, the image photographing section for picking up an image and an image processing section for collating the picked-up image and estimating the image pickup position of the picked-up image are separated and are connected by the communication network and processing of image collating, etc., is executed in the image collating center and if the image provider transmits an image to the image collating center, the position and the attitude of the image provider can be returned to the image provider, so that the image pickup information recognition system has the advantage that the apparatus that must be provided by the image provider can be minimized.

The image collating center extracts appropriate geographic information from the geographic information database, simulatively generates a simulated image of the surrounding landscape, building, etc., assumed to be viewed from the image provider, and collates the simulated image with the picked-up image received from the image provider, so that the image pickup information recognition system has the advantage that collating is possible even if the image provided when the mark building is viewed from the viewpoint of the image provider does not exist as an image in the geographical information database.

To generate a simulated image, a plurality of estimates of the image pickup position and the image pickup attitude are set, a plurality of simulated images are generated, and the simulated image having the maximum match degree with the picked-up image is selected, so that the image pickup information recognition system has the advantage that the best estimates among the simulated images collated with the picked-up image can be returned.

In the embodiment described above, a plurality of estimates of the image pickup position and the image pickup attitude are set, the image pickup position and the image pickup attitude are estimated, and both the estimated image pickup position and image pickup attitude are transmitted, but only either of the image pickup position and the image pickup attitude may be transmitted.

A plurality of estimates of only the image pickup position may be set and only the image pickup position may be estimated and transmitted.

A plurality of estimates of only the image pickup attitude may be set and only the image pickup attitude may be estimated and transmitted.

Second Embodiment

In the first embodiment described above, a plurality of estimates of the image pickup position and the image pickup attitude are set, a plurality of simulated images are generated for the combinations of the setup estimates of the image pickup position and the image pickup attitude, and each of the simulated images is collated with the picked-up image, but the estimates of the image pickup position and the image pickup attitude may be again set from the beginning and a simulated image may be generated each time for estimating the image pickup position and the image pickup attitude of the image provider until the simulated image and the picked-up image match. A second embodiment of the invention shows such an image pickup information recognition system (position/attitude recognition system), and the image pickup information recognition system has the same configuration as that previously described with reference to FIGS. 1 to 3.

Figure 5:
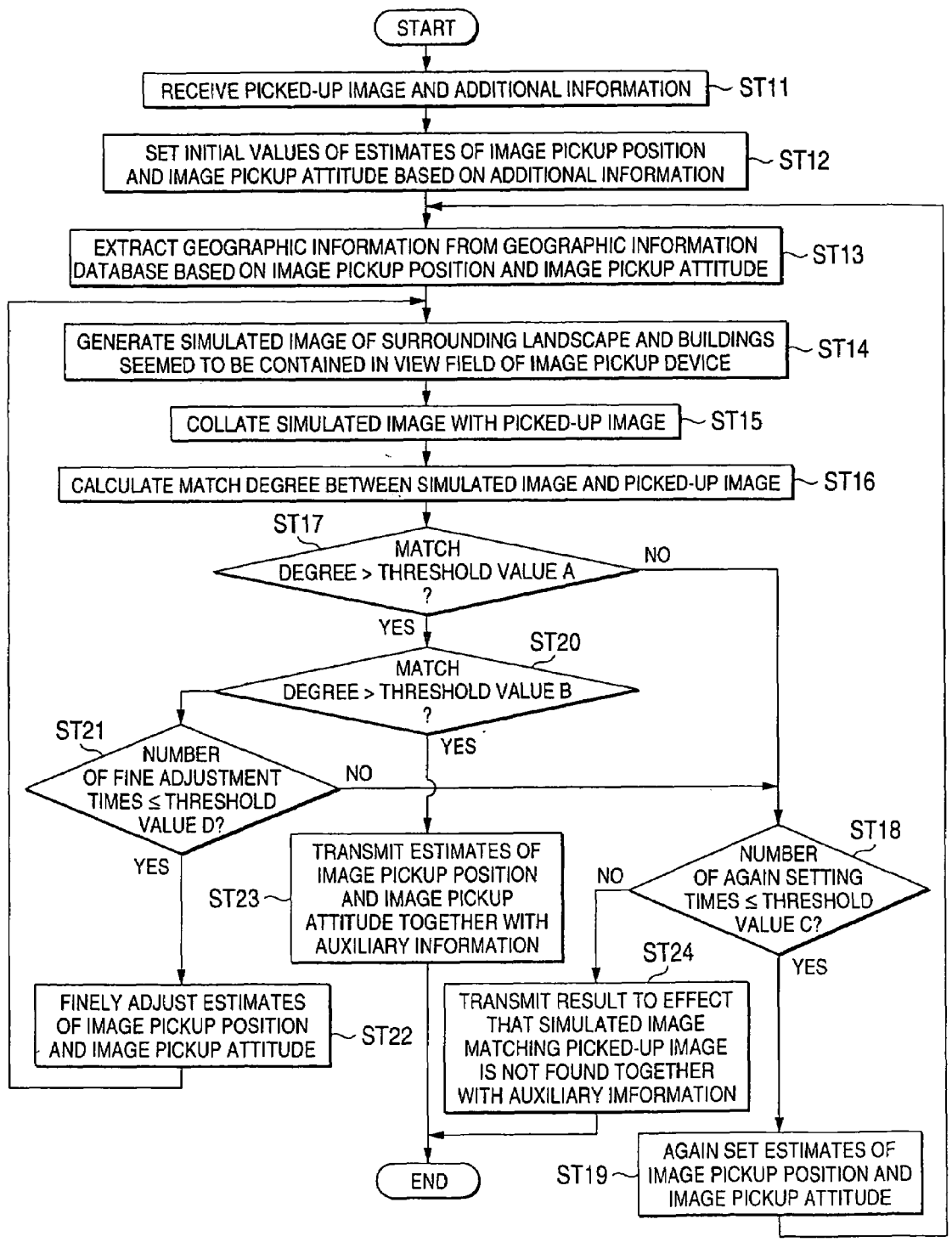
FIG. 5 is a flowchart to show the operation of an image collating center according to a second embodiment of the invention.
Figure 6:
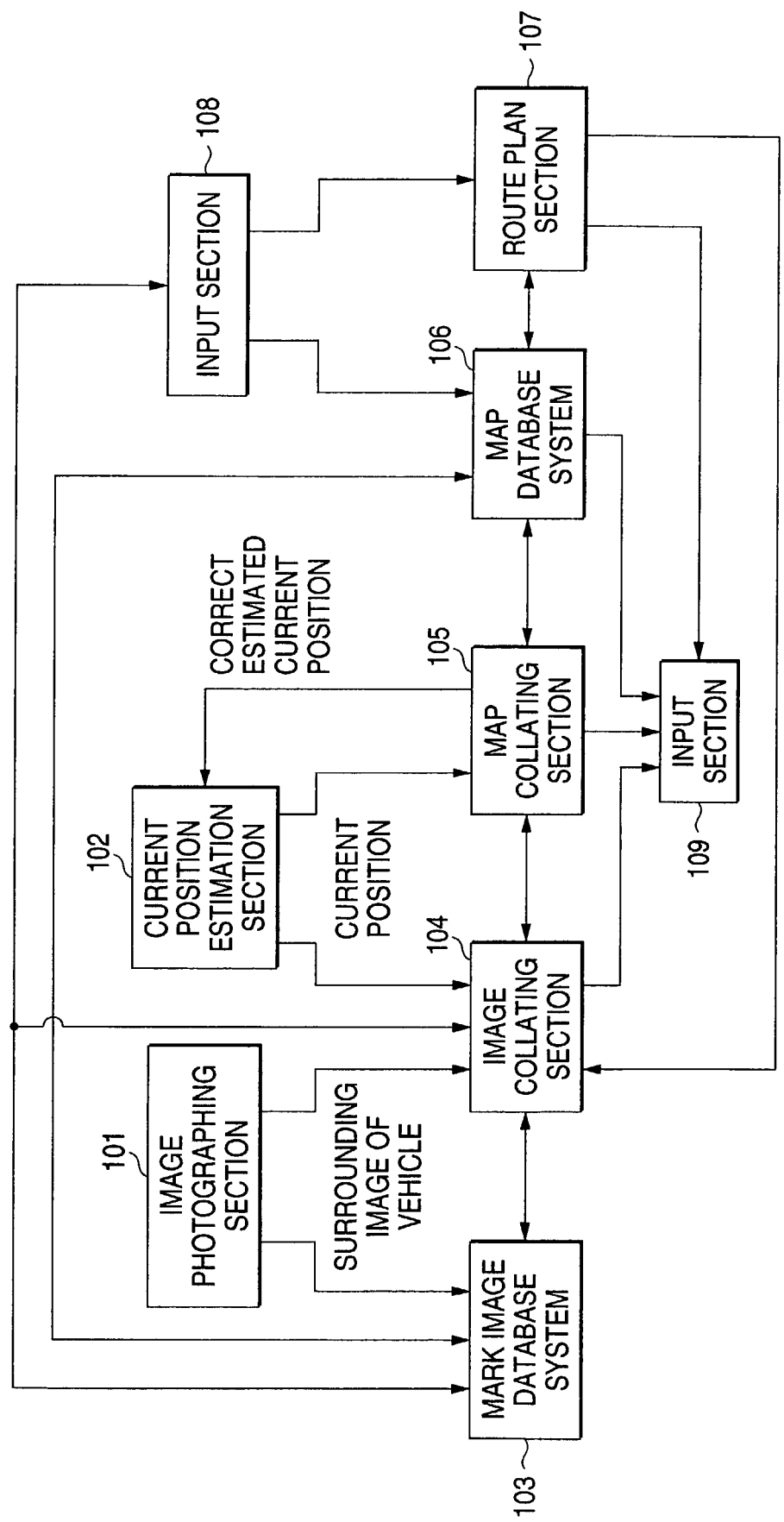
FIG. 6 is a block diagram to describe an image pickup information recognition system in a related art.

FIG. 5 is a flowchart to describe the operation of an image collating center in the image pickup information recognition system according to the second embodiment of the invention.

In FIG. 5, at step ST11, a picked-up image and additional information from an image provider are received through a communication network. The additional information transmitted together with the picked-up image includes information indicating at least the rough position of the image provider as described above, and at step ST12, the initial values of the estimates of image pickup position and image pickup attitude are set based on the information contained in the received additional information. At step ST13, geographic information corresponding to the initial values of the estimates of the image pickup position and the image pickup attitude set at step ST12 is extracted from a geographic information database. At step ST14, a simulated image provided by simulating the image of the surrounding landscape and buildings seemed to be contained in the view field of the image pickup device in the image provider is generated based on the extracted geographical information. At step ST15, the simulated image generated at step ST14 is collated with the picked-up image received from the image provider. At step ST16, the match degree between the simulated image and the picked-up image is calculated. At step ST17, whether or not the match degree is greater than a predetermined threshold value A is determined. If the match degree is less than the threshold value, control goes to steps ST18 and ST19 and the initial values of the estimates of the image pickup position and the image pickup attitude are again set (or the estimates of the image pickup position and the image pickup attitude again set are again set) and steps ST13 to ST17 are repeated a predetermined number of setting times (threshold value C) or less until the match degree becomes greater than the predetermined threshold value A. If the match degree is greater than the predetermined threshold value A at step ST17, control goes to step ST20 and whether or not the match degree is greater than a predetermined threshold value B is determined. If the match degree is less than the predetermined threshold value B at step ST20, control goes to steps ST21 and ST22 and the estimates of the image pickup position and the image pickup attitude set or again set are finely adjusted and steps ST14 to ST20 are repeated a predetermined number of fine adjustment times (threshold value D) or less until the match degree becomes greater than the predetermined threshold value B. If the match degree is greater than the predetermined threshold value B at step ST20, control goes to step ST23 and the estimates of the image pickup position and the image pickup attitude corresponding to the simulated image at the time are assumed to be the image pickup position and the image pickup attitude of the image provider and the estimates of the image pickup position and the image pickup attitude together with auxiliary information (for example, simulated image) are returned to the image provider 1 through the communication network 4. If the number of again setting times is greater than the threshold value C at step ST18, control goes to step ST24 and the collating result to the effect that a simulated image matching the picked-up image is not found is returned together with auxiliary information (for example, the simulated image at the time) to the image provider 1 through the communication network 4.

As described above, in the embodiment, to generate a simulated image, the estimates of the image pickup position and the image pickup attitude are again set from the beginning and a simulated image may be generated each time for estimating the image pickup position and the image pickup attitude of the image provider until the simulated image and the picked-up image match, so that the pickup image information recognition system of the embodiment has the advantage that it can return more precise estimates of the image pickup position and the image pickup attitude than that of the first embodiment.

In the embodiment described above, the estimates of the image pickup position and the image pickup attitude are again set from the beginning for estimating the image pickup position and the image pickup attitude, and both the image pickup position and the image pickup attitude are transmitted, but only either of the image pickup position and the image pickup attitude may be transmitted.

The information transmitted to the image provider 1 may contain no auxiliary information.

The estimate of only the image pickup position may be again set from the beginning for estimating only the image pickup position, and only the image pickup position may be transmitted.

The estimate of only the image pickup attitude may be again set from the beginning for estimating only the image pickup position, and only the image pickup attitude may be transmitted.

In the first and second embodiments described above, if it is hard to collate because the picked-up image itself is unclear or additional information is insufficient, it is advisable to not only inform the image provider 1 that it is hard to collate, but also instruct the image provider 1 to acquire additional information required for facilitating the reason and collating, for example, images of a distant view, a close-range view, and left and right positions and display the image pickup direction, the presence or absence of a mark, and the features of the mark for requesting the image provider 1 to provide an additional picked-up image, additional information concerning the acquisition circumstances, etc. The image provider 1 again transmits such additional information and the image collating center 2 again collates based on the additional information repeatedly, whereby it is made possible to collate the simulated image with the picked-up image more reliably.

Further, if the reliability of information transmitted from the image provider 1 is very high as the image provider 1 is a researcher in the image collating center 2 or a staff member in an earth observation center or the property of the image provider 1 is contained in a part of the transmitted image, the difference from the simulated image generated with the geographic information database 3 may be extracted as the part to be updated and a database update request and the update contents may be transmitted to the geographic information database 3 via the communication network 4. Particularly, if an observation image can be gotten periodically as with an artificial satellite, the described processing may be automated.

As described above, according to the invention, the image pickup information recognition system includes reception section for receiving a picked-up image and additional information concerning the picked-up image from an image providing source through a communication network, processing section for extracting geographic information from a geographic information database based on the additional information concerning the picked-up image received, simulatively generating a simulated image assumed to be viewed from the image providing source, collating the simulated image with the picked-up image received from the image providing source, and estimating an image pickup position or an image pickup attitude of the picked-up image in response to the collating result, and transmission section for transmitting the estimated image pickup position or image pickup attitude to the image providing source, so that the image pickup information recognition system has the advantage that the apparatus that must be provided by the image provider can be minimized.

Since collating is possible even if the mark image does not exist as an image in the geographical information database, it is made possible to provide image pickup information of the mark image whose the viewing direction is changed without using the previously constructed geographic information database.

According to the invention, the processing section includes section for extracting geographic information from the geographic information database based on the additional information concerning the picked-up image received and simulatively generating a plurality of simulated images assumed to be viewed from the image providing source, section for collating each of the plurality of simulated images with the picked-up image, and section for estimating that position information or attitude information in the simulated image having the maximum match degree with the picked-up image is the image pickup position or the image pickup attitude of the picked-up image, so that the image pickup information recognition system has the advantage that the best estimates among the simulated images collated with the picked-up image can be returned.

According to the invention, the processing section includes section for extracting geographic information from the geographic information database based on the additional information concerning the picked-up image received and simulatively generating a simulated image assumed to be viewed from the image providing source, section for collating the simulated image with the picked-up image, section for repeating generation of the simulated image and collation of the simulated image with the picked-up image a setup number of times or less until the match degree between the simulated image and the picked-up image becomes equal to or greater than a predetermined value, and section for estimating that position information or attitude information in the simulated image when the match degree between the simulated image and the picked-up image is equal to or greater than the predetermined value is the image pickup position or the image pickup attitude of the picked-up image, so that the image pickup information recognition system has the advantage that more precise estimates can be returned.

According to the invention, the described image pickup information recognition system further includes section for requesting the image providing source to additionally transmit a picked-up image or additional information, so that it is made possible to collate the simulated image with the picked-up image more reliably and it is made possible to return more precise estimates.

What is claimed is:

1. An image pickup information recognition system comprising:
    a communication network;
    a geographic information database in communication with the communication network;
    an image provider located on a vehicle, providing picked-up images, and in communication with the communication network; and
    an image collating center in communication with the communication network, located at a location different from location of the vehicle including the image provider and the location of the geographic information database, the image collating center collating picked-up images from the image provider and geographic information from the geographic information database to determine vehicle location and communicating the vehicle location determined to the vehicle, the image collating center comprising
        a reception section for receiving a picked-up image and additional information concerning the picked-up image from the image provider through the communication network,
        a processing section for extracting geographic information from the geographic information database based on the additional information concerning the picked-up image received, generating a simulated image assumed to be viewed from any image provider, collating the simulated image with the picked-up image received from the image provider, and estimating image pickup position from the picked-up image based on the collating, and
        a transmission section for transmitting the image pickup position estimated to the vehicle.

2. The image pickup information recognition system as claimed in claim 1, wherein the processing section estimates, from collating the simulated image with the picked-up image received from the image provider, image pickup attitude of the image provider.

3. The image pickup information recognition system as claimed in claim 2, wherein the transmission section transmits the image pickup attitude estimated to the vehicle.

4. The image pickup information recognition system as claimed in claim 1, wherein the image collating center includes a section for requesting the image provider to transmit, additionally, a picked-up image or additional information.

* * * * *